July 17, 1934.   G. B. POLLOCK   1,966,683
PRESSURE PLATE FOR FILM MOVEMENT MECHANISM
Filed Dec. 15, 1931   5 Sheets—Sheet 1
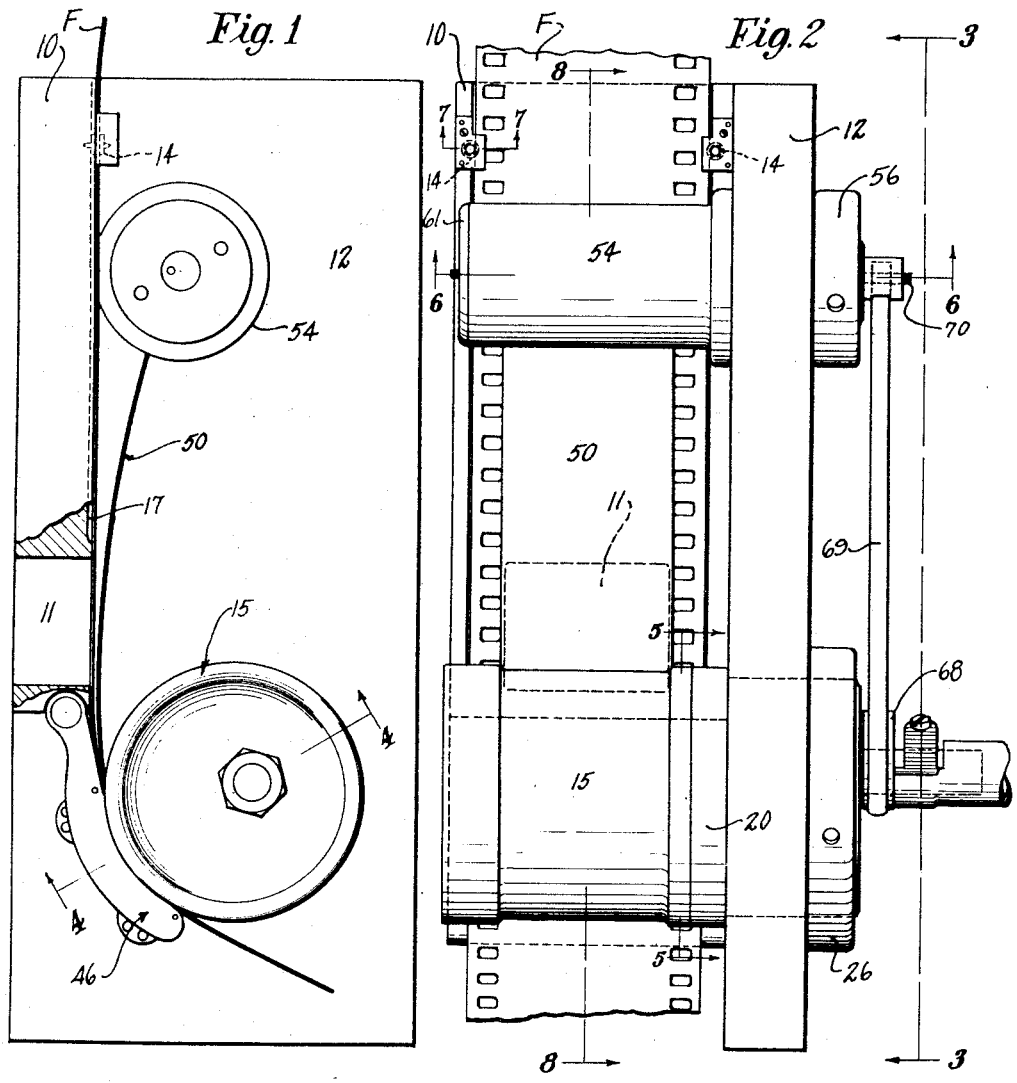
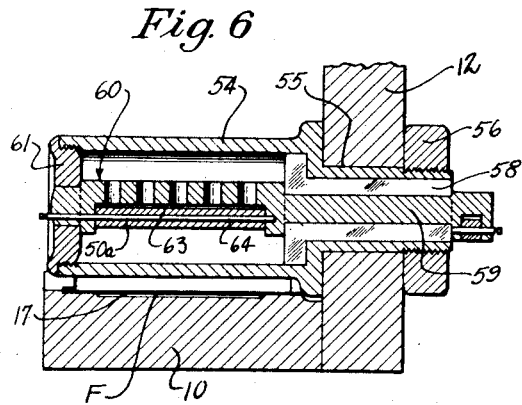
Inventor
Gordon B. Pollock.
Attorney.

July 17, 1934.  G. B. POLLOCK  1,966,683
PRESSURE PLATE FOR FILM MOVEMENT MECHANISM
Filed Dec. 15, 1931  5 Sheets-Sheet 2
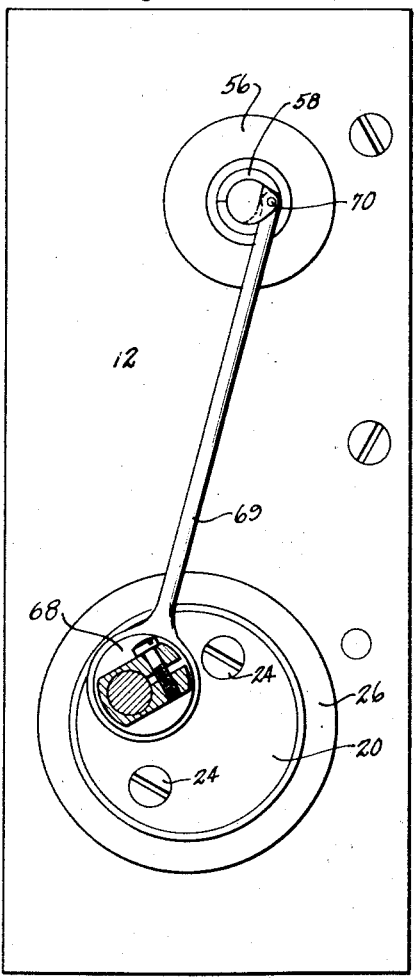
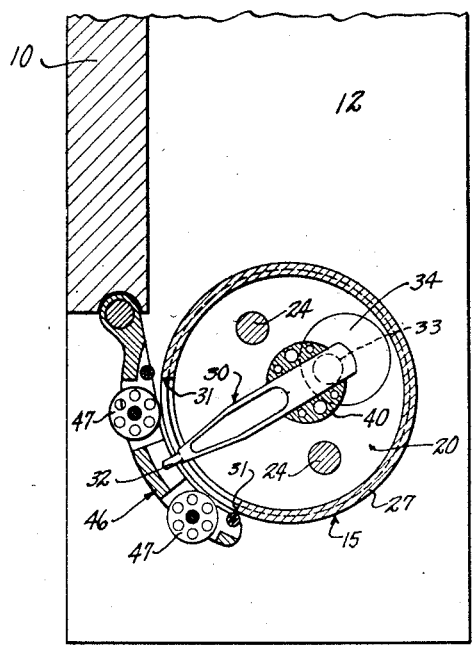
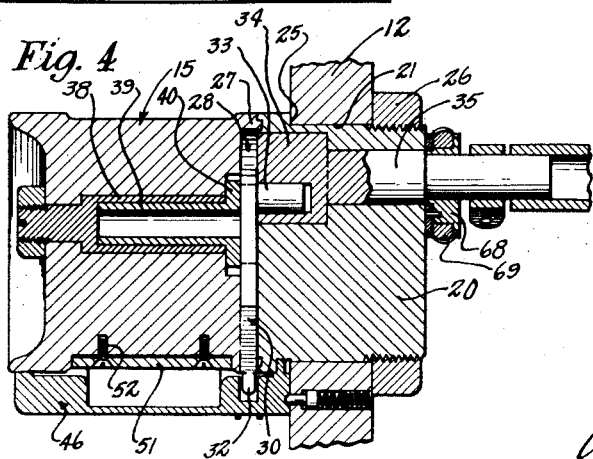
Inventor
Gordon B. Pollock.
Attorney.

July 17, 1934.  G. B. POLLOCK  1,966,683
PRESSURE PLATE FOR FILM MOVEMENT MECHANISM
Filed Dec. 15, 1931  5 Sheets-Sheet 3
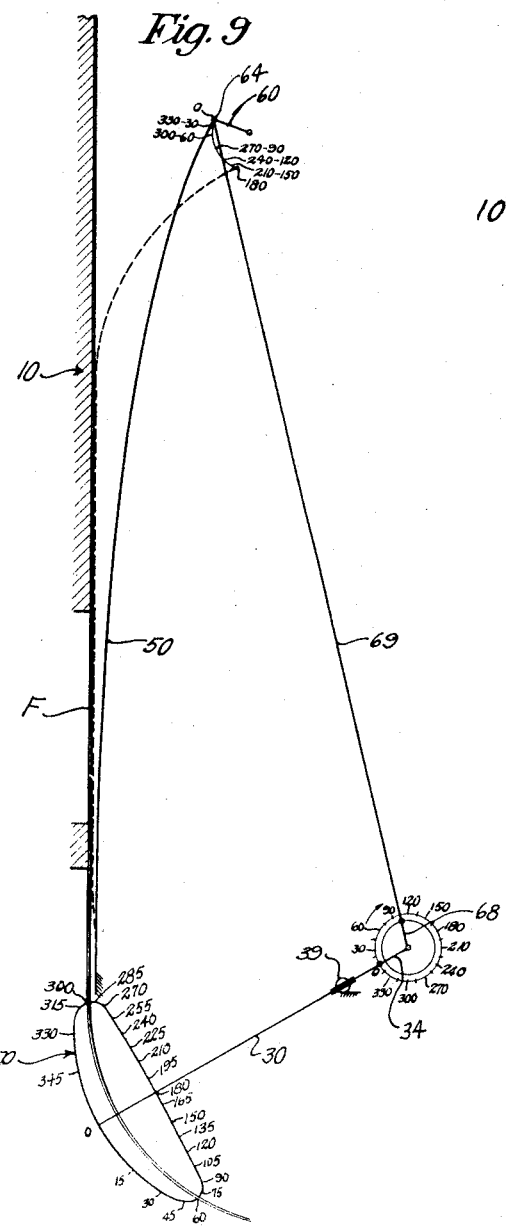
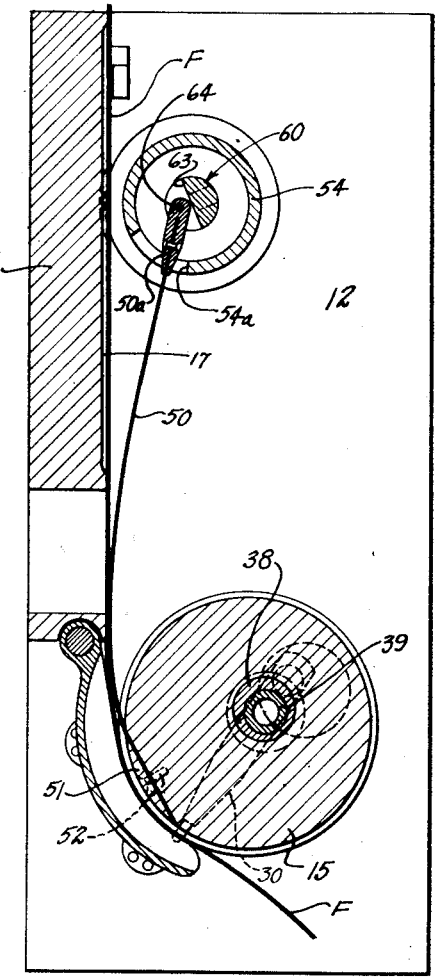
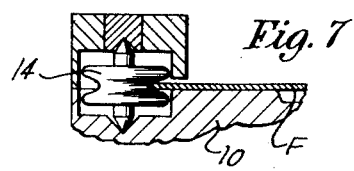
Inventor
Gordon B. Pollock.
Attorney.

July 17, 1934. G. B. POLLOCK 1,966,683
PRESSURE PLATE FOR FILM MOVEMENT MECHANISM
Filed Dec. 15, 1931  5 Sheets-Sheet 4
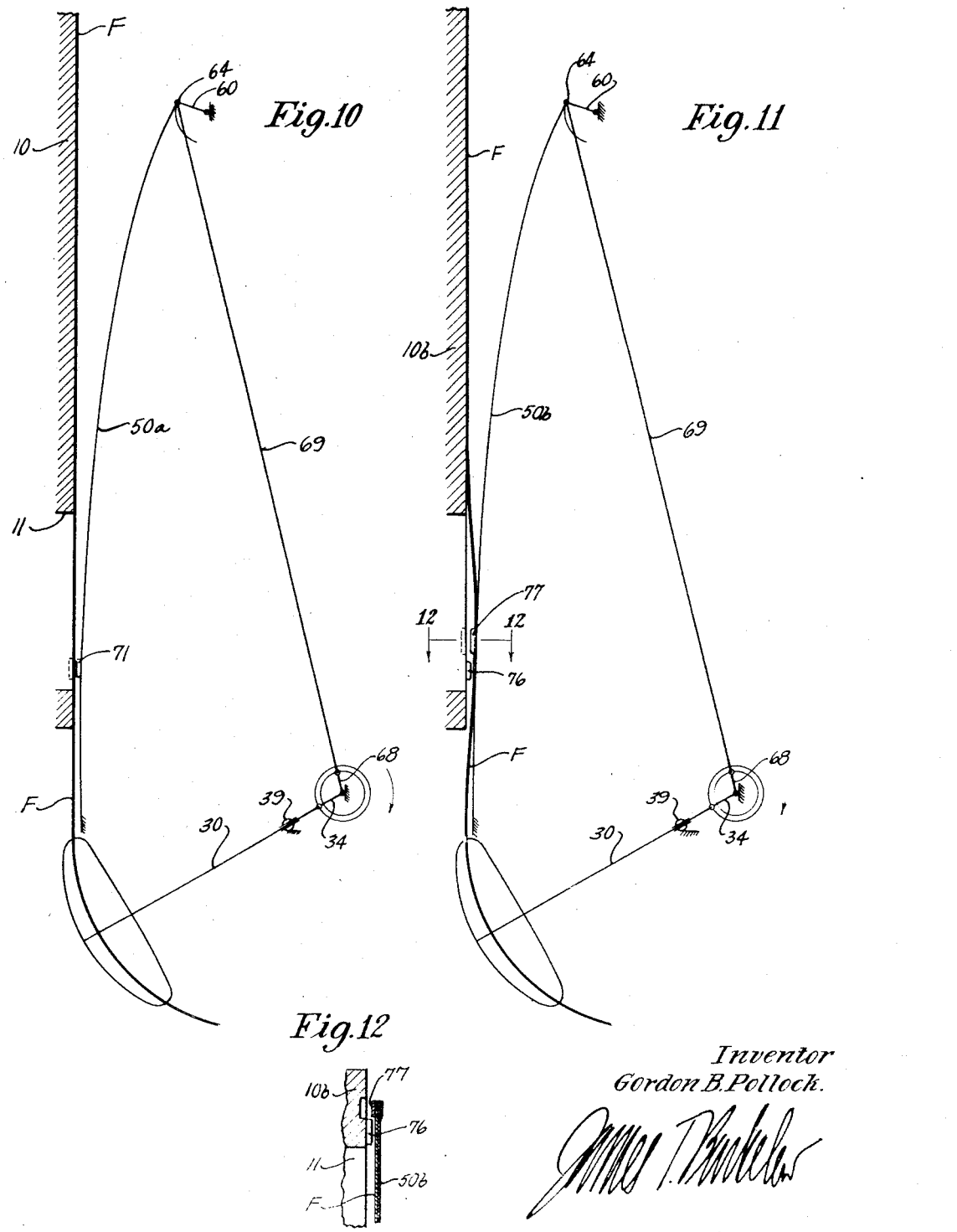
Inventor
Gordon B. Pollock.
Attorney.

July 17, 1934.  G. B. POLLOCK  1,966,683
PRESSURE PLATE FOR FILM MOVEMENT MECHANISM
Filed Dec. 15, 1931    5 Sheets-Sheet 5
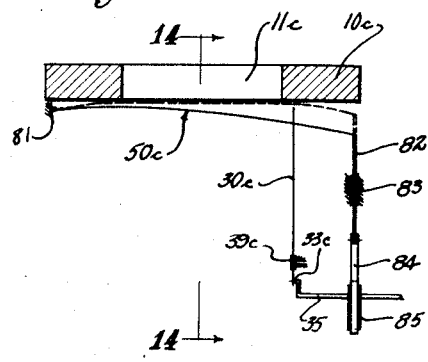
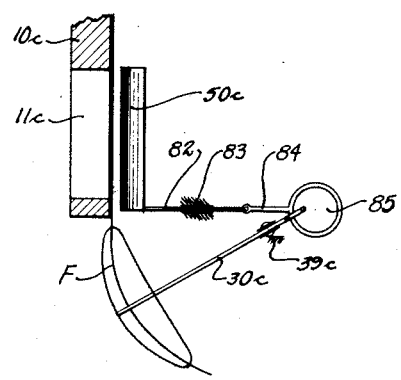
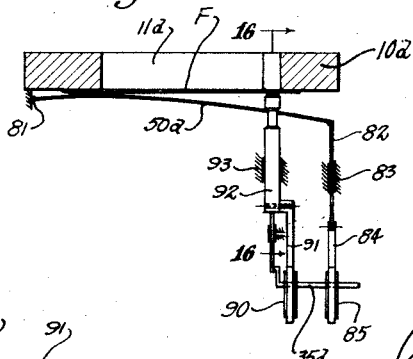
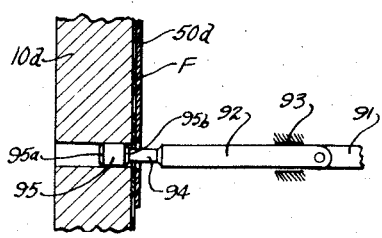
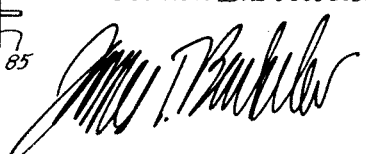
Inventor
Gordon B. Pollock.
Attorney.

Patented July 17, 1934

1,966,683

UNITED STATES PATENT OFFICE 1,966,683

PRESSURE PLATE FOR FILM MOVEMENT MECHANISM

Gordon B. Pollock, Los Angeles, Calif.

Application December 15, 1931, Serial No. 581,156

19 Claims. (Cl. 88—18.4)

This invention relates generally to intermittent film movement mechanism for motion picture machines such as cameras, printers, projectors and the like, and it is a general object of the present invention to provide improved means for holding the film stationary at the exposure aperture during the periods of rest of the film.

In a motion picture camera, for example, claw mechanism is provided which intermittently engages perforations in the film and draws the film downwardly through successive frame lengths. At the end of the pull down, the mechanism disengages and leaves the film stationary while returning for the next pull down, and during this period of film rest the shutter uncovers a film frame registered before the exposure aperture. During this exposure, as is well known, the film must be held perfectly stationary and in perfect register with the aperture. Various film holding means timed to operate in consonance with the film movement mechanism so as to engage the film alternately therewith have been provided heretofore, among which may be mentioned, first, plates which are pressed against the film in the film guide, and second, pilot or register pins which enter the film perforations.

The present invention relates to improvements in the film holding mechanism, and may be broadly characterized as involving, in each of its variations, a flexible resilient plate that is flexed to engage the film progressively, touching the film first along one "line" and then moving by a "rolling" action progressively into engagement with the film throughout the entire contact area. As a result of the flexibility of the plate, there is assurance that the film is held securely at all points, and when two or more films are being registered together, the films are held in perfect intimacy of contact. Moreover, the rolling action expresses any air beneath the film, or between two or more films being registered together, and in this manner further enhances the flatness of the film or intimacy of contact.

The spring pressure plate may also be used in combination with register pins adapted for engagement with the film perforations. Thus, in one form, register pins are carried directly by the pressure plate and register the film accurately while the plate moves against the film to hold it stationary or in contact with another film. In another form, the film guide is provided with stationary register pins, and the spring plate is provided with means for stripping the film off said pins for movement by the pull down mechanism. And in another form, a separately operated register pin registers the film just before engagement by the pressure plate.

The film holding mechanism of the present invention is here shown in combination with a preferred type of movement involving an oscillative claw arm driven at its rear end by a crank and having a slide-pivot guide intermediate its ends, such a movement being described in my copending application entitled "Film movement", filed Dec. 15, 1931, Ser. No. 581,155; but while the present invention is particularly adapted in certain respects to use with that type of movement, it will be obvious that it is applicable as well to any other type of movement. It is also to be understood that while the present film holding mechanism involves principally the flexing pressure plate, certain novel features of the mechanism may be used in combination in mechanisms not utilizing said plate, and such features per se are therefore not to be limited to combination with any particular mechanism except when so claimed.

With this preliminary discussion in mind the invention will best be understood from the following detailed description of a present preferred embodiment, reference for this purpose being had to the accompanying drawings, in which:

Fig. 1 is a side elevation of a film movement embodying my improvements;

Fig. 2 is a side elevation looking from the right in Fig. 1;

Fig. 3 is a rear elevation of the movement, looking in the direction indicated by line 3—3 of Fig. 2;

Fig. 4 is a section taken on line 4—4 of Fig. 1;

Fig. 5 is a section taken on line 5—5 of Fig. 2;

Fig. 6 is a section taken on line 6—6 of Fig. 2;

Fig. 7 is an enlarged detail section taken on line 7—7 of Fig. 2;

Fig. 8 is a section taken as indicated by line 8—8 of Fig. 2;

Fig. 9 is a diagram of the movement and film holding means;

Fig. 10 is a diagram of a variational form of the invention;

Fig. 11 is a diagram of another variational form of the invention;

Fig. 12 is a detail section taken on line 12—12 of Fig. 11;

Fig. 13 is a diagram of another form of the invention;

Fig. 14 is a section taken on line 14—14 of Fig. 13;

Fig. 15 is a diagram of another form of the invention; and

Fig. 16 is an enlarged detail section taken as indicated by line 16—16 of Fig. 15.

In the form of movement shown in Figs. 1 to 8 inclusive, numeral 10 designates a vertical film guide plate having a light or exposure aperture 11, and numeral 12 designates a vertical wall arranged at right angles to and extending rearwardly from an edge of plate 10. The film is guided downwardly adjacent the rear face of plate 10 between a pair of guide rollers 14 mounted at the upper end of the plate, and then down and around a cylindrical guide surface formed on the periphery of a cylinder 15, said cylinder enclosing the intermittent film movement mechanism, as more fully described hereinafter. Above aperture 11 the face of plate 10 may be recessed as at 17 to clear the emulsion area on the film.

The preferred film movement is shown in detail in Figs. 4 to 6, to which attention is now directed. Cylinder 15 is mounted concentrically on a cylindrical carrier block 20 of the same diameter, which in turn is mounted in a round opening 21 in wall 12, cylinder 15 being secured to block 20 as by screws 24. Block 20 has a shoulder 25 that comes against the front surface of wall 12, and its rear end is screw-threaded to take a nut 26 which is set up tightly to hold the block in proper position.

The inner end of cylinder 15 is formed with an annular flange 27 which defines an enclosed compartment 28 for the oscillative claw arm 30. Flange 27 is cut away at 31 to permit the forward end of arm 30 to reach the film, and the forward end of said arm is provided with a film engaging claw pin 32 of proper size to fit nicely in the film perforations. The rear end of claw arm 30 has an inwardly extending crank pin 33 driven by a crank disk 34 on the end of a drive shaft 35, said crank disk and drive shaft being journalled in carrier block 20, as clearly shown in Fig. 4. Shaft 35 is driven at constant speed in any suitable manner. Mounted to oscillate in a bushing 38 in cylinder 15 is a pivot member comprising a sleeve 39 having on its end a slotted head 40 through which claw arm 30 slides.

On the side of the film opposite cylinder 15 is a gate 46 of any approved form, that here shown having rollers 47 holding the film up to the claw arm. Attention is here called to my copending application entitled "Gate for film movement mechanism", Ser. No. 581,157, filed Dec. 15, 1931, wherein the present gate is completely described and claimed.

In the operation of the film movement, the rotation of drive shaft 35 causes the crank and slide-pivot claw arm guide to operate the arm in such a manner that the claw pin on the arm describes a path p as indicated in the diagram of Fig. 9; and it will be understood without detailed discussion how the claw arm moves into engagement with the film, draws the film downwardly through a frame length, and then disengages the film and moves upwardly to again engage the film for the next pull down.

I proceed now to a description of the film holding means of the present invention, reference first being directed to the form shown in Figs. 1 to 8. Numeral 50 designates the flexible resilient pressure plate, which is preferably a strip of spring steel just greater in width than aperture 11 (see Fig. 2). The lower end of plate 50 is stationarily secured, for instance, to cylinder 15, preferably in the manner clearly shown in Figs. 4 and 8. As there shown the strip is inserted below a segment 51 of the cylinder, screws 52 securing the segment and strip in place. The plate thus extends upwardly tangentially from the side of the cylinder and angularly to the film guide plate, and the film is guided downwardly from said guide plate between the gate and the adjacent surface of the plate and then around the merging lower surface of the cylinder.

The upper end of plate 50 is pivotally connected to a crank (see Figs. 6 and 8) which when oscillated through a given angle causes the plate alternately to flex or bow into face to face engagement with the film and to hold the film stationary against the guide plate, and to retract to clear the film for movement by the claw arm, the crank of course being operated in proper consonance with the claw arm. Said crank, hereinafter to be more particularly described, is encased within a cylinder 54 mounted on wall 12 above aperture 11 in the relative arrangement shown in Figs. 1 and 2, the cylinder having an opening 54a through which the pressure plate 50 extends. Cylinder 54 has in its inner end a reduced tubular section 55 that extends through plate 12 and is screw-threaded on its projecting end to take a nut 56 which is set up to secure the cylinder in proper position. Tubular part 55 receives a split bushing 58, within which is journalled the reduced section 59 of a crank shaft generally designated at 60. The outer end of shaft 60 is journalled within a head 61 screw-threaded within the end of the cylinder 54. The section of shaft 60 between bushing 58 and head 61 is cut away on a plane through its central axis, as indicated at 63, and a crank pin 64 is mounted longitudinally on the shaft and offset with respect to the shaft axis so as to run through the opening provided by the shaft portion thus cut away. The upper end of spring plate 50 is clamped by a plate 50a, which is pivotally connected to crank pin 64, as clearly shown in Figs. 6 and 8; and it will be readily understood how oscillation of shaft 60 will move the upper end of the plate down and then up to cause the plate first to bow into engagement with the film to hold the film fast, and then to straighten out and release the film for movement.

For the purpose of interconnecting plate 50 and its operating crank shaft 60 to operate in consonance with the claw mechanism, the drive shaft 35 of the claw mechanism is provided with an eccentric 68 connected by a rod 69 to an offset crank pin 70 carried by the rear end of crank shaft 60.

In Fig. 1, and in Fig. 9 in full lines, the claw arm is midway in the pull down stroke, and the pressure plate is straightened out to free the film for movement, it being noted that crank pin 64 is then at the upper extreme of its range of movement. Now when shaft 35 has been rotated sufficiently to bring the claw arm to the end of its pull down stroke, which is at the 60 degree point in Fig. 9, members 68, 69 and 70 have oscillated shaft 60 to lower crank pin 64 and the upper end of spring plate 50 until the plate has advanced sufficiently just to engage the film, the initial line of film engagement in the present instance being just below or near the lower edge of aperture 11. The last described position is shown in Fig. 8. The timing of the mechanism is preferably such that the film is initially engaged by the plate just before disengagement of the film by the claw pin. This timing characteristic may be regulated by the adjustment of the length of the plate, or by vertical adjustment of the mounting of the plate at either of its ends. For instance, the vertical position of the lower mounting of the plate on cylinder 15 may be adjusted somewhat by rotation of carrier block 20 in wall 12.

As the claw pin is then returned through the first half of its path out of film engagement (from 60 to 180 degrees in Fig. 9), the crank pin 64 is moved to the lower extreme of its range of movement, and pressure plate 50 is thereby caused to flex and move forwardly into full engagement with the film over aperture 11. It will be noted that the pressure plate engages the film progressively, first touching the film near the lower edge of the aperture, and then progressively coming against the film until the entire area over and surrounding the aperture is engaged and pressed against the aperture plate. That is, the rolling line of contact of the pressure plate progresses along the film beginning at the point of contact nearest the fixed end of the pressure plate.

The film is held against shifting after the first engagement by the pressure plate, and the further progressive engagement by the plate stretches the film out flat over the aperture by a rolling contact action, which is similar to that of a roller—rolling over the film in its method of contact but is dissimilar in that the pressure of the plate on the film behind the point of rolling contact remains. As has been stated, the pressure plate first engages the film at about the lower edge of the aperture, and does so, preferably, just before the claw pin disengages the film, or at approximately the 60 degree point in the diagram. The pressure plate then progresses into full engagement with the film area at the aperture within the next few degrees, entirely covering that film area at approximately the 75 degree point. The film is then held by the plate in this manner during its entire stationary or exposure period, from substantially 75 degrees to 285 degrees in the diagram. Between 285 degrees and 300 degrees the claw pin moves to again engage the film for the next pull down, and during that time the pressure plate is straightening out to free the film, until finally, preferably just after such engagement of the film by the claw pin, the pressure plate entirely clears the film for movement.

The flexibility of the plate insures the best possible engagement between itself and the film, irrespective of such factors as variation in film thickness or irregularity in the film surface. And in cases such as in contact printers where two or more films are to be registered, the flexibility of the plate is conducive to greatly improved intimacy of contact between the several films. Moreover, the progressive contact of the plate with the film expresses any air under the film, thereby causing the film to be pressed out flat either onto the aperture plate or onto another film, or will press two or more films flatly onto the aperture plate and express all the air between the several films (as for instance if two or more films are being moved, as in a contact printer). Further, any tendency for the film to buckle at the aperture plate is prevented, the progressive rolling film engagement moving the buckle away from the clamped part of the film.

In another form of my invention the flexible pressure plate is provided with a register pin or pins adapted to engage film perforations to give added insurance of perfection of registration. In such a case registration is insured by the register pin, while the pressure plate serves to carry the register pin into engagement with the film, and then itself engages the film to hold it flat and motionless in the exposure plane. Such an arrangement is indicated in the diagram of Fig. 10, where the parts are numbered as in the previous forms, but the pressure plate 50a is provided with a film engaging register pin 71.

In another form of my invention the aperture plate 10b is provided with a stationary pin or pins. The flexible pressure plate 50b in advancing forces the film on the register pin; and the pressure plate is provided with means for stripping the film off the pin when retracting so as to free the film for movement. This form of the invention is diagrammed in Figs. 11 and 12, where a stationary register pin is shown mounted on the aperture plate 10b at 76, and the pressure plate 50b is provided with film engaging stripper fingers 77 which reach around the two edges of the film and pull the film off the register pin with the retraction of the pressure plate. In this form also, registration is effected primarily by the register pin, while the pressure plate subsequently engages the film to hold it flat.

Figs. 13 and 14 are diagrams illustrating another form of the invention. The claw arm is indicated at 30c, driven by crank pin 33c of drive shaft 35c, and having a slide pivot 39c. The spring pressure plate is indicated at 50c, being in this case arranged transversely across the aperture 11c of aperture plate 10c, and being stationarily mounted at one of its ends, as at 81. The other end of plate 50c is connected to an arm 82 which slides through a guide at 83, and is pivotally connected to an arm 84 operated by an eccentric 85 on shaft 35c, as indicated. The operation of this arrangement of the invention will be understood to be similar to that of the arrangement first described, with the exception that the pressure plate is horizontally arranged and progresses horizontally into engagement with the film due to forward movement of the operating arm. The device in this form has the advantages of simplicity and compactness. It will be understood that the previously described register pin provisions may be used with this form of pressure plate also.

Figs. 15 and 16 show a novel combination of a pilot pin with the form of Figs. 13 and 14. The present arrangement may be exactly like the form described in connection with Figs. 13 and 14, but has in addition an eccentric 90 on drive shaft 35d which operates an arm 91 pivoted to a pilot pin member 92 guided as at 93 and extending through plate 50d to reach the film perforations. Member 92 has a thin neck 94 of a cross-sectional size less than that of a film perforation, and a head 95 shaped to fit nicely in the film perforations. Head 95 is bevelled preferably both at its forward and rearward ends, as indicated at 95a and 95b, respectively.

In operation, just as, or slightly before, the claw arm 30d disengages the film, the head 95 of the pilot pin enters a film perforation and thereby registers the film, after which the pressure plate 50d first engages the film. The head 95 then passes on through the perforation and clears the film, the slender portion of the member not touching the perforation edges, but at such time the film is held by the pressure plate. The advantage of the slenderized portion of the pilot pin member is that the saw of the pin on the film edges is confined to the relatively short head. In retraction, the pressure plate first relieves the film, and then the head of pilot member passes through and clears the film, after which the film can be moved by the claw arm.

It will be understood the drawings and description are to be considered merely as illustrative of and not restrictive on the broader claims appended hereto, for various changes in design, structure and arrangement may be made without departing from the spirit and scope of said claims.

I claim:

1. In film holding mechanism, a frame with a film guide plate, a flexible resilient pressure plate stationarily mounted at one end and having a normal curvature convex toward the film on the guide plate, and means for moving the other end of said plate towards said stationarily mounted end to cause the plate to flex into engagement with the film.

2. In film holding mechanism, a frame with a film guide plate, a flexible resilient pressure plate having a normal curvature convex toward the film on the guide plate, mounting means for one end of said plate, and means for moving the other end of said plate back and forth in a direction substantially parallel to said guide plate so as first to flex the pressure plate to engage the film and then to straighten the plate to release the film.

3. In film movement mechanism, a frame with a film guide plate, intermittent means for engaging and moving a film on said guide plate, a flexible resilient pressure plate arranged behind the film and stationarily mounted at one of its ends, means for moving the other end of said plate toward and from said stationarily held end to cause the plate alternately to flex into engagement with the film on said guide plate and to straighten to release the film for movement, and means operating said last mentioned means to engage and disengage the film alternately with said intermittent film moving means.

4. In film movement mechanism, a frame with a film guide plate, intermittent means for engaging and moving a film past on said guide plate, a flexible resilient pressure plate arranged behind the film over said aperture, means for holding one end of said plate in a stationary position, means for adjusting the position at which said stationarily mounted end is held, means for moving the other end of said plate toward and from said stationarily held end to cause the plate alternately to flex into engagement with the film on the guide plate aperture and to straighten to release the film for movement, and means operating said last mentioned means to engage and disengage the film alternately with said intermittent film moving means.

5. In film movement mechanism, a frame with a film guide plate, intermittent means for engaging and moving a film on said guide plate, a flexible resilient pressure plate arranged behind the film, means for holding one end of said plate in a stationary position, means for adjusting the position at which said stationarily mounted end is held, means for moving the other end of said plate back and forth in a direction substantially parallel to the film guide plate to cause the pressure plate alternately to flex into engagement with the film on the guide plate and to straighten to release the film for movement, and means operating said last mentioned means to engage and disengage the film alternately with said intermittent film moving means.

6. In film movement mechanism, a frame with a film guide plate, intermittent film movement means for engaging and moving a film past on said guide plate, a flexible resilient pressure plate arranged behind the film and stationarily mounted at one of its ends, means for oscillating the other end of the plate to cause the plate alternately to flex into engagement with the film and to straighten to release the film for movement, said means comprising an oscillative crank, and interconnecting means causing oscillation of said crank in consonance with the operation of the film movement means.

7. In film movement mechanism, a frame with a film guide plate, intermittent film movement means for engaging and moving a film on said guide plate, a drive shaft for said film movement means, a flexible resilient pressure plate arranged behind the film and stationarily mounted at one of its ends, an oscillative crank for oscillating the other end of the plate to cause the plate alternately to flex into engagement with the film and to straighten to release the film for movement, means comprising an eccentric and connecting rod interconnecting the drive shaft of the film movement means and said crank whereby the film movement means and pressure plate are operated alternately to engage the film.

8. In film movement mechanism, a frame with a vertical film guide plate, a flexible resilient pressure plate arranged behind the film and stationarily mounted at its lower end, and means for moving the upper end of said plate alternately down and up to cause the plate alternately to bow into engagement with the film and to straighten to release the film for movement.

9. In film movement mechanism, a frame with a vertical film guide plate, a flexible resilient pressure plate arranged behind the film, vertically adjustable means for engaging and fixing the position of the lower end of said plate, and means for moving the upper end of said plate alternately down and up to cause the plate alternately to bow into engagement with the film and to straighten to release the film for movement.

10. In film movement mechanism, a frame with a vertical film guide plate, a flexible resilient pressure plate arranged longitudinally of the film and stationarily mounted at one of its ends, and means for oscillating its opposite end in a vertical direction to cause the plate alternately to bow into engagement with the film and to straighten to release the film movement.

11. In film movement mechanism, a frame with a film guide plate on which a film is guided in a vertical direction, a flexible resilient pressure plate arranged behind the film and stationarily mounted at one vertical edge, and means for oscillating the other vertical edge of said pressure plate to cause the plate alternately to bow into engagement with the film and to release the film for movement.

12. In film holding mechanism, a frame with a film guide plate, a flexible resilient pressure plate having a normal curvature convex toward the film on the guide plate and adapted to be flexed to engage a film on said guide plate, and to be straightened to clear the film for movement, a register pin on said pressure plate adapted to engage a film perforation as the plate is moved into engagement with the film, and to clear the film when the plate is straightened, and means for relatively moving one end of said plate toward and from the other for alternately flexing and straightening the pressure plate.

13. In film holding mechanism, a frame with a film guide plate, a register pin on said guide plate adapted to engage a perforation of a film moved against the guide plate, a flexible resilient pressure plate adapted to be flexed to move the film against the guide plate, whereby said register pin engages a film perforation, and to be straightened to retract from the guide plate, means on said pressure plate for stripping the film off said register pin during such retractive movement, and means for alternately flexing and straightening said pressure plate.

14. In film registry mechanism, the combination of a frame with a film guide plate, a pressure plate adapted to engage a film on the guide plate, a register pin adapted to engage a perforation of a film on the guide plate, said register pin comprising a head having a beveled nose and shaped to fit the film perforations, and having a comparatively slender section behind said head adapted to clear the perforation edges, operating means for said register pin arranged to thrust the register pin head entirely through the perforation of a film on the guide plate, and means operating in consonance with said register pin operating means causing engagement of the film by the pressure plate after engagement by said register pin.

15. In film holding mechanism, a frame with a film guide plate, a flexible resilient pressure plate disposed behind said guide plate and having a normal curvature convex toward the film in the guide plate, and means for moving one end of said plate relatively toward and from the other to bow said plate into engagement with a film on said guide plate and to move said plate out of film engagement.

16. In film holding mechanism, a frame with a film guide plate, a flexible resilient pressure plate disposed behind said guide plate and having a normal curvature convex toward the film in the guide plate, mounting means for holding one end of said plate stationary, and means attached to the other end of said plate adapted to move said end to bow the plate into engagement with a film on the guide plate.

17. In film holding mechanism, a frame with a film guide plate, a flexible resilient pressure plate disposed behind said guide plate and having a normal curvature convex toward the film in the guide plate, mounting means for holding one end of said plate stationary, and means attached to the other end of said plate adapted to move said other end relatively to said stationarily held end to cause said plate to engage a film on said guide plate.

18. In film holding mechanism, a frame with a film guide plate, a flexible resilient pressure plate disposed behind said guide plate and having a normal curvature convex toward the film in the guide plate, mounting means for holding one end of said plate stationary, and means pivotally connected to the other end of said plate and adapted to move said other end in a manner to cause said plate to move into engagement with a film on the guide plate.

19. In film holding mechanism, a frame with a film guide plate, a flexible resilient pressure plate disposed behind said guide plate and having a normal curvature convex toward the film in the guide plate, mounting means for holding one end of said plate stationary, and means pivotally connected to the other end of said plate and adapted to move said other end toward and from said stationarily held end to cause said plate alternately to bow into engagement with a film on said guide plate and to relatively straighten to free the film for movement.

GORDON B. POLLOCK.